United States Patent [19]

Kitagawa et al.

[11] Patent Number: 4,951,027

[45] Date of Patent: Aug. 21, 1990

[54] LOAD CELL

[75] Inventors: Tohru Kitagawa, Mishima; Takaharu Yamasita, Shizuoka, both of Japan

[73] Assignee: Tokyo Electric Co., Ltd., Tokyo, Japan

[21] Appl. No.: 418,712

[22] Filed: Oct. 3, 1989

Related U.S. Application Data

[63] Continuation of Ser. No. 95,760, Sep. 11, 1987, abandoned.

[30] Foreign Application Priority Data

Sep. 22, 1986 [JP] Japan .................. 61-224574

[51] Int. Cl.⁵ .............................. G01L 1/22
[52] U.S. Cl. ............................... 338/2; 338/3
[58] Field of Search ................ 338/3, 4, 5, 2; 73/862.65

[56] References Cited

U.S. PATENT DOCUMENTS

| | | | |
|---|---|---|---|
| 3,600,942 | 8/1971 | Brendle | 338/5 X |
| 4,322,707 | 3/1982 | Ort | 338/2 |
| 4,332,174 | 6/1982 | Suzuki et al. | 73/862.65 |
| 4,343,197 | 8/1982 | Suzuki et al. | 73/862.65 |
| 4,628,296 | 12/1986 | Kitagawa et al. | 338/3 |

FOREIGN PATENT DOCUMENTS 60-244819 12/1985 Japan .................. 3/14

*Primary Examiner*—Bruce A. Reynolds
*Assistant Examiner*—Marin M. Lateef
*Attorney, Agent, or Firm*—Frishauf, Holtz, Goodman & Woodward

[57] ABSTRACT

A load cell comprises a distortion generating body including first and second arms each of which has a thickness y and which are arranged in parallel, and thin deformable portions of a thickness x, which are coupled to the two ends of each of the first and second arms and each of which has flat and curved surfaces facing each other, a height of the distortion generating body, a distance between both of the thin deformable portions coupled with both ends of each of the first and second arms, and a radius of curvature of the curved surface of the thin deformable portions being set to predetermined values H, D, and R, respectively, strain gauges insulatively formed on the flat surfaces of the thin deformable portions coupled with both ends of the first arm, and leading portions connecting the strain gauges to form a bridge circuit. The thickness y is given by a linear equation $y = ax + b$, and constants a and b are determined by a linear equation $p = aq + b$ indicating the relation between thicknesses p and q with respect to a plurality of standard load cells each of which includes the distortion generating body having predetermined height H, predetermined distance D, and predetermined radius R. Each of the thin deformable portions has a thickness q and a thickness p of each of the first and second arms is set according to the thickness q to give a linear load weight-output voltage characteristic.

4 Claims, 6 Drawing Sheets

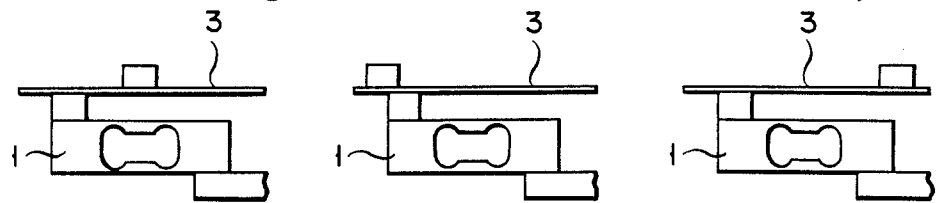
FIG. 2A (PRIOR ART)   FIG. 2B (PRIOR ART)   FIG. 2C (PRIOR ART)
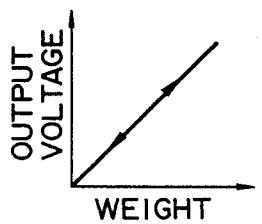 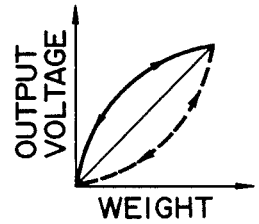 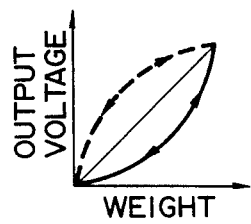
FIG. 3A (PRIOR ART)   FIG. 3B (PRIOR ART)   FIG. 3C (PRIOR ART)

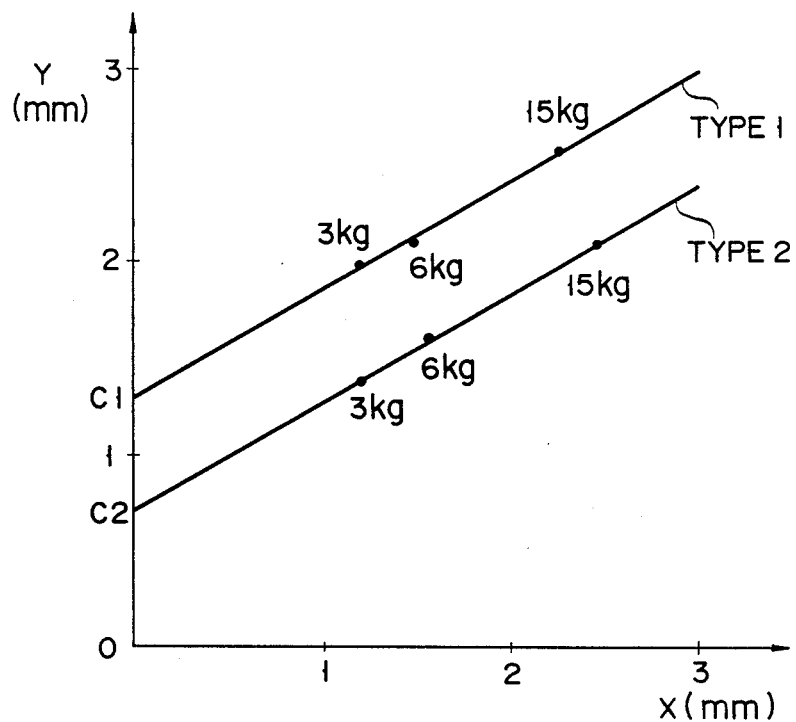
F I G. 11

LOAD CELL

This application is a continuation of application Ser. No. 095,760, filed Sept. 11, 1987, abandoned.

BACKGROUND OF THE INVENTION

The present invention relates to a load cell having strain gauges for converting a mechanical distortion, which is caused by a load, into an electrical signal and measuring the weight of the load.

In general, this type of load cell has two parallel arm portions arranged between the fixing portion and the movable portion to which a load is applied, and includes a distortion-generating body made of a metal wherein two thin deformable portions are formed in each of the arm portions, in positions corresponding to four corners of a parallelogram whose two sides are constituted by those two arms portions. Strain gauges are adhered to each of the thin deformable portions, which, in effect, means they are adhered to both sides of the distortion generating body.

There are, however, several drawbacks inherent in this type of load cell, drawbacks such as complicated manufacturing processes, low yield, and high cost. To eliminate these drawbacks, the strain gauges are formed on one surface of the distortion-generating body, by use of the thin film technique. More precisely, a pair of strain gauges are formed in each of the two thin deformable portions of only one of the two arm portions, these four strain gauges being then bridge-connected.

The structure of such a load cell will now be described in detail, with reference to FIGS. 1 and 2A to 2C. First, distortion-generating body 1 is formed, from a stainless metal high tensile aluminum, or the like. Body 1 includes two parallel extending arm portions 5A and 5B for coupling fixing end portion 2, which is secured to a non-movable portion such as a base or the like, and movable end portion 4, to which is coupled pan 3 (FIGS. 2A to 2C). Arm portions 5A and 5B are formed to have thin deformable portions 6A, 6b, 6C and 6D at positions corresponding to the corners of a parallelogram which is formed by fixing end portion 2, movable end portion 4, and arm portions 5A and 5B. Coupling holes 7 and 8 are formed in fixing end portion 2 and in movable end portion 4, respectively. Using the thin film technique, four strain gauges 9 are formed on one side of distortion generating body 1, through an insulative layer on thin deformable portions 6A and 6B. These strain gauges 9 are bridge-connected by leading portions 10, which are also formed by means of the thin film technique, and are connected to an external circuit by terminal portions 11. In this way, a bridge balance type load cell is formed for generating an output voltage in accordance with a load applied onto pan 3.

In the case where strain gauges 9 are formed on one side of distortion generating body 1, if an unbalanced load acts on distortion generating body 1, various modes of distortion are generated which cannot be cancelled by each other. As a result, the linearity of the load weight-output voltage characteristic is degraded, lowering the accuracy of the load cell.

FIG. 2A shows a state in which a load is applied so that its weight does not act in an unbalanced fashion on distortion generating body 1. In this case, the load weight-output voltage characteristic has the linearity as shown in FIG. 3A. However, in the case of FIGS. 2B and 2C, the load weight-output voltage characteristic has nonlinearity, as is shown in FIGS. 3B and 3C. In FIGS. 3B and 3C, a broken line indicates that the output voltage characteristic may change in the opposite direction when distortion generating body 1 is formed in a different shape.

SUMMARY OF THE INVENTION

It is an object of the present invention to provide a load cell which can produce an output voltage which varies in a substantially linear fashion, in accordance the load weight, even if an unbalanced load is applied thereto.

This object is accomplished by a load cell comprising a distortion-generating body which includes first and second arms, each of which has a thickness y and which are arranged in parallel, and thin deformable portions of a thickness x, which are coupled to the two ends of each of the first and second arms and each of which has flat and curved surfaces on both sides, the height of the distortion generating body, the distance between the two thin deforming portions coupled to the two ends of each of the first and second arms, and the radius of curvature of the curved surface of the thin deformable portions being set to predetermined values H, D, and R, respectively; strain gauges insulatively formed on the flat surfaces of the thin deformable portions coupled to both ends of the first arm; and leading portions which connect the strain gauges, to thereby form a bridge circuit, the thickness y being given by way of a linear equation $y = ax + b$, constants a and b having been previously determined by way of a linear equation $p = aq + b$, which indicates the relation between thicknesses p and q with respect to a plurality of standard load cells each of which includes the distortion generating body having a predetermined height H, a predetermined distance D between the two thin deformable portions coupled to the two ends of each of first and second arms, and a predetermined radius R of curvature of each of the thin deformable portions, and wherein each of the thin deformable portions has a thickness q, and thickness p of each of the first and second arms is set in accordance with the thickness q, so as to provide a linear load weight-output voltage characteristic.

According to the present invention, by merely changing thickness y of the arm portion, accompanied by a change in thickness x of the thin deformable portion, on the basis of the linear equation of $y = ax + b$, it is possible to generate an output voltage which changes in a substantially linear fashion, in accordance the load weight, without being influenced by an unbalanced load.

BRIEF DESCRIPTION OF THE DRAWINGS

FIGS. 2A to 2C are diagrams showing a state in which a load is applied to the load cell shown in FIG. 1;

FIGS. 3A to 3C are load weight-output voltage characteristic diagrams of a load cell in the states shown in FIGS. 2A to 2C;

FIG. 11 shows the relations between the thicknesses of the thin deformable portions and arm portions which are constructed similarly to the load cells shown in FIGS. 9 and 10.

DETAILED DESCRIPTION OF THE PREFERRED EMBODIMENT

Figure 1:
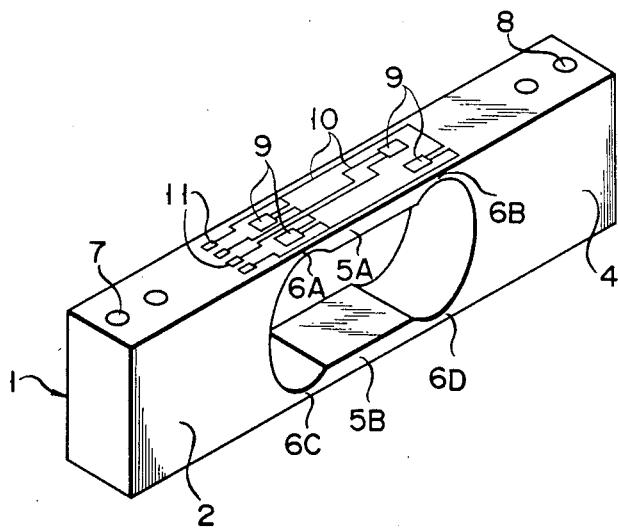
FIG. 1 is a perspective view of a conventional load cell.
Figure 4:
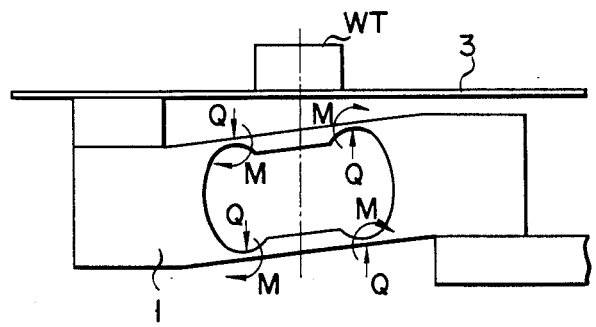
FIG. 4 shows a load cell according to an embodiment of the present invention in the case where a load is applied to the central portion of the load cell.

An embodiment of the present invention will be described with reference to the drawings, in which the same parts and components as those described in FIGS. 1 and 2A to 2C are designated by the same reference numerals and their descriptions are omitted. First, a fundamental structure of the load cell shown in FIG. 4 is similar to that shown in FIG. 1. Load WT is applied onto the central line of distortion generating body 1. Due to this load WT, load weight Q and moment M are generated in thin deforming portions 6A to 6D. Distortion or strain $\delta_p$ is generated in thin deforming portions 6A to 6D by load weight Q and moment M. The amount of distortion $\delta_p$ is proportional to load WT and the load weight-output voltage characteristic has the linearity.

Figure 5:
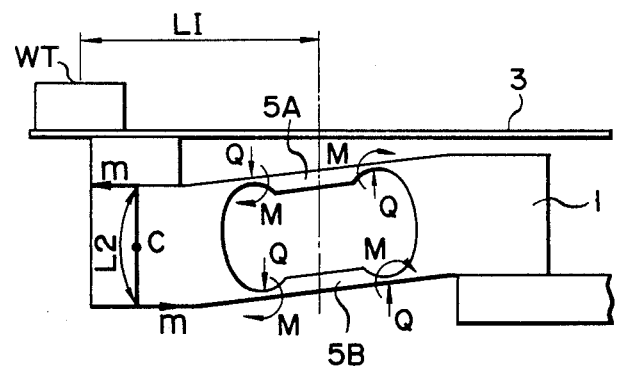
FIGS. 5 and 6 are explanatory diagrams of various kinds of distortions which are caused when an unbalanced load is applied to the load cell.

Next, FIG. 5 shows a state in which load WT is applied at the position which is deviated from the central axis of distortion generating body 1 by $L_1$. In addition to distortion $\delta_p$, moment m around point c is generated so as to satisfy $WT \times L_1 = m \times L_2$. An extension force acts on upper arm portion 5A and a contraction force acts on lower arm portion 5B, so that distortion $\delta_m$ is generated in thin deformable portions 6A to 6D.

Figure 6:
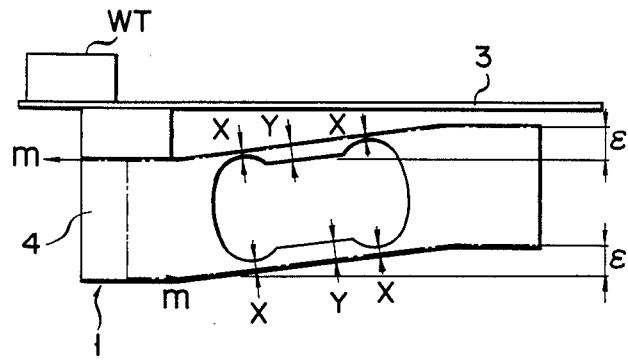

On the other hand, as shown in FIG. 6, the moment which is given by $MB = m \cdot \epsilon$ ($\epsilon$ is a vertical deviation amount of movable end portion 4) acts on arm portions 5A and 5B, so that distortion $\delta_B$ is generated. The amount of distortion $\delta_B$ changes nonlinearly with a change in load WT.

Further, when a thickness of thin deformable portion 6 is set to x and a thickness of arm portion 5 is set to y, the value of deviation amount $\epsilon$ varies according to the values of x and y. The nonlinearity characteristic of distortion $\delta_B$ for the load change in an unbalanced load state changes.

On the other hand, although distortion $\delta_s$ is generated in each of thin deformable portions 6A to 6D by moment m, the positions of thin deformable portions 6A to 6D slightly change due to its deformation by load WT and the amount of distortion $\delta_s$ nonlinearly changes. The nonlinear characteristic of distortion $\delta_s$ varies depending on the shapes of thin deformable portions 6A to 6D. By changing the shapes of thin deformable portions 6A to 6D, the nonlinear characteristic of distortion $\delta_s$ for the load change in an unbalanced load state changes.

Figure 7:
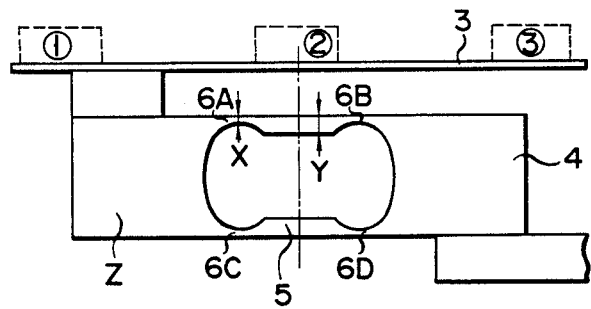
FIG. 7 shows a load cell in the state in which no load is applied.

The variation modes of distortion in respective thin deformable portions 6A to 6D of the load cell shown in FIG. 7 are indicated in Tables 1 to 3 on the basis of the foregoing distortion modes. Namely, the cases where load WT are applied to points ①, ②, and ③, are shown in Tables 1 to 3, respectively.

Figure 8:
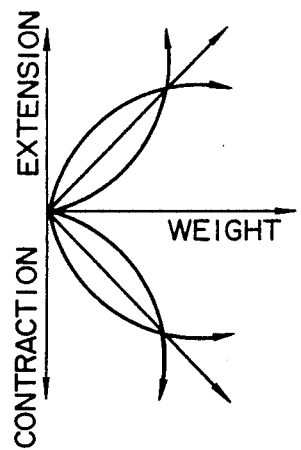
FIG. 8 shows the relation between the extension/contraction amount of a thin deformable portion of the load cell shown in FIG. 7 and the unbalanced load.

On the other hand, as shown in FIG. 8, three variation modes of distortion are provided for an increase in load; in the first variation mode, the variation rate is constant, in the second variation mode, it gradually increases, and in the third variation mode, it gradually decreases when the thin deformable portion extends with an increase in load. On the other hand, when the thin deformable portion contracts with an increase in load, there are also three variation modes wherein the variation rate is constant, gradually increases, and gradually decreases. Further, in Tables 1 to 3, a horizontal arrow indicates the state in which the amount of distortion does not change.

TABLE 1

| | A | B | C | D |
|---|---|---|---|---|
| $\delta_p$ | ↘ | ↗ | ↗ | ↘ |
| $\delta_m$ | ↗ | ↗ | ↘ | ↘ |
| $\delta_B$ | ⌒↑ | ↘⌒ | ⌒↑ | ↘⌒ |
| $\delta_s$ | ↘⌒ | ↘→ | ⌒↗ | ⌒↑ |

TABLE 2

| | A | B | C | D |
|---|---|---|---|---|
| $\delta_p$ | ↘ | ↗ | ↗ | ↘ |
| $\delta_m$ | → | → | → | → |
| $\delta_B$ | → | → | → | → |
| $\delta_s$ | → | → | → | → |

TABLE 3

| | A | B | C | D |
|---|---|---|---|---|
| $\delta_p$ | ↘ | ↗ | ↗ | ↘ |
| $\delta_m$ | ↘ | ↘ | ↗ | ↗ |
| $\delta_B$ | ↓ | ↗ | ↓ | ↑ |
| $\delta_s$ | ↑ | → | ↘ | ↓ |

First, as will be obvious from Table 2, when load WT is applied to the central portion of distortion generating body 1, the total distortion is only $\delta_p$ and increases in proportion to load WT and linearly changes.

In the distortion states shown in Tables 1 and 2 of the load cell to which an unbalanced load is applied, distortions $\delta_B$ and $\delta_s$ are generated as errors which change nonlinearly with load WT. As mentioned above, distortions $\delta_B$ and $\delta_s$ vary in dependence on the shapes of arm portions 5A and 5B and thin deformable portions 6A to 6D of distortion-generating body 1. Therefore, by changing the shape of distortion generating body 1, it will be possible to cancel distortions $\delta_B$ and $\delta_s$ with each other.

Figure 9:
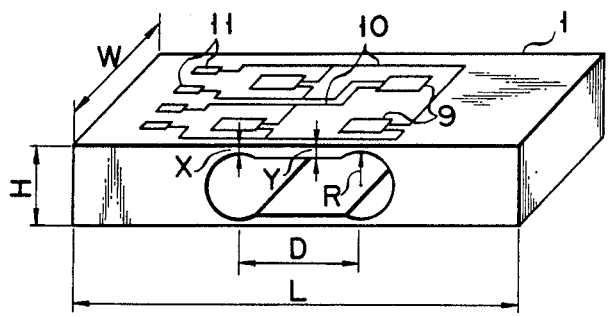
FIGS. 9 and 10 show load cells which are used in the embodiment of the invention.
Figure 10:
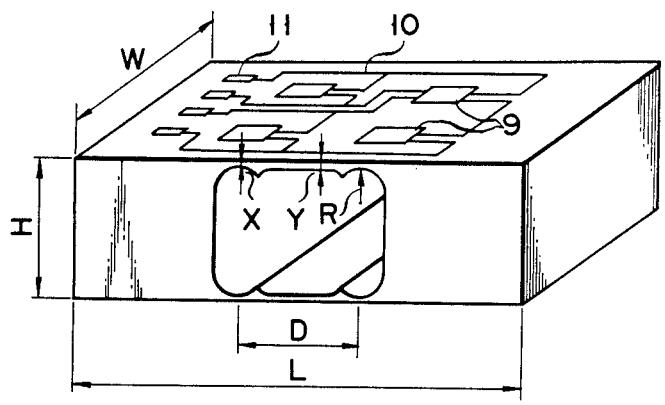

Distortion generating bodies 1 as shown in FIGS. 9 and 10 are prepared in consideration of such conditions. Distortion generating body 1 of the type 1 shown in FIG. 9 is formed such that its height H is lower than that of the type 2 shown in FIG. 10.

In general, thickness x of each of thin deformable portions 6A to 6D is determined in accordance with the rated load such that even when the maximum load is applied to the load cell, the thin deformable portions are not permanently deformed. Value x determines the load weight-output voltage characteristic of the load cell. Height H of distortion generating body 1, distance D between thin deformable portions 6A and 6C and between thin deformable portions 6B and 6D, and a radius R of curvature of each of thin deformable portions 6A to 6D are set to predetermined values, respectively. Thereafter, thickness y is changed in accordance with thickness x and set to values such that the load cell can exhibit the linear load weight-output voltage characteristic even when the unbalanced load is applied thereto. In this manner, by setting thickness x for the rated load and by setting thickness y for the newly set value x, the relations between x and y for load cells with different rated loads can be obtained. In this case, it should be noted that height H, distance D and radius in each of the same type of load cells are respectively set to the same values.

In this embodiment, the rated load is set to 3 kg, 6 kg, and 15 kg. FIG. 11 shows the relations between x and y which are measured for each type of load cells.

In the case of distortion generating body 1 of the type 1, length L is set to 148 mm, height H is set to 25 mm, width W is set to 20 mm, distance D is set to 40 mm, and radius R of curvature is set to 12 mm. Thickness x of each of thin deforming portions 6A to 6D is set to values g of 1.2 mm, 1.6 mm, and 2.2 mm for the rated loads of 3 kg, 6 kg and 15 kg, respectively. In each case, thickness y of arm portions 5A and 5B is set to specific a value p that the output voltage linearly changes with the load. The relations between y and for the respectively rated loads x are shown in FIG. 11. As is clearly seen from FIG. 11, the three measured values p of y are obtained on a substantially straight line. Such a straight line is expressed as follows:

$$y = a_1 x + b_1 \quad (a_1 \text{ and } b_1 \text{ are constants}) \quad (1)$$

Similarly, in the case of distortion generating body 1 of the type 2, length L is set to 148 mm, height H is set to 45 mm, width W is set to 20 mm, distance D is set to 40 mm, and thickness x of each of thin deforming portions 6A to 6D is set to values g of 1.2 mm, 1.6 mm and 2.45 mm for the rated loads of 3 kg, 6 kg and 15 to obtain values p, respectively, of y kg. Similarly to the case of distortion generating body 1 of the type 1, there is the linear relation between x and y which is expressed as follows:

$$y = a_2 x + b_2 \quad (a_2 \text{ and } b_2 \text{ are constants}) \quad (2)$$

Therefore, the relation between x and y for the types 1 and 2 can be generalized to $$y = ax + b \quad (a \text{ and } b \text{ are constants})$$

In order to form a load cell having a distortion generating body whose height H, distance D, and radius R are set to the same values as those of the distortion generating body of type 1 or 2, thickness x is first determined according to the rated load, and then thickness y is determined using the foregoing equation (1) or (2). With the load cell thus formed, even if an unbalanced load is applied to distortion generating body 1, the distortion components which nonlinearly change are cancelled with each other. Thus, the linear load weight-output voltage characteristic can be always obtained.

As described above, in this invention, a plurality of standard load cells are used. The distortion generating body of each standard load cell is formed to have height H, distance D and radius R of predetermined values and thickness x of a different value. Then, thicknesses y are determined according to thicknesses x to establish a linear function: $y = ax + b$. Using the thus established linear function, a load cell having the same height H, distance D and radius R and different thickness x can be easily obtained.

Although the invention has been described with respect to a preferred embodiment, the invention is not limited to only this embodiment.

What is claimed is:

1. A load cell comprising:
   a distortion generating body including first and second arms each of which has a thickness y and which are arranged in parallel, and thin deformable portions of a thickness x, which are coupled to the two ends of each of the first and second arms and each of which has flat and curved surfaces on both sides facing each other, the height of said distortion generating body, the distance between said two thin deformable portions coupled to the two ends of each of said first and second arms, and the radius of curvature of the curved surface of the thin deformable portions being set to predetermined values H, D, and R, respectively;

a plurality of strain gauges insulatively formed on the flat surfaces of the thin deforming portions coupled to the two ends of said first arm; and a plurality of leading portions connecting said strain gauges to form a bridge circuit, wherein the thickness y is given by a linear equation $y = ax + b$ for a selected thickness x, and constants a and b are previously determined with respect to a plurality of standard load cells each of which includes the distortion generating body having a predetermined height H, a predetermined distance D between the two thin deformable portions coupled to both ends of each of the first and second arms, and a predetermined radius R of curvature of each of the thin deformable portions, and wherein each of the thin deformable portions has a value of q for thickness x, and a value of p for thickness y of each of the first and second arms is set corresponding to said thickness value q, in accordance with the linear equation $p = aq + b$ so as to provide a linear load weight-output voltage characteristic.

2. A load cell according to claim 1, wherein said distortion generating body is fixed at one lower end, and a pan is attached at the other upper end.

3. A load cell according to claim 2, wherein said thin deforming portions are formed to have flat outside surfaces.

4. A load cell according to claim 1, wherein said thin deforming portions are formed to have flat outside surfaces.

* * * * *